(12) United States Patent
Labour et al.

(10) Patent No.: US 9,009,739 B2
(45) Date of Patent: *Apr. 14, 2015

(54) SAFE BROWSER PLUGINS USING NATIVE CODE MODULES

(71) Applicant: Google Inc., Mountain View, CA (US)

(72) Inventors: Antoine Labour, Mountain View, CA (US); Matthew Papakipos, Palo Alto, CA (US); Shiki Okasaka, Tokyo (JP); Jeffrey R. Timanus, Montreal (CA)

(73) Assignee: Google Inc., Mountain View, CA (US)

( * ) Notice: Subject to any disclaimer, the term of this patent is extended or adjusted under 35 U.S.C. 154(b) by 266 days.

This patent is subject to a terminal disclaimer.

(21) Appl. No.: 13/688,776

(22) Filed: Nov. 29, 2012

(65) Prior Publication Data

US 2013/0159394 A1 Jun. 20, 2013

Related U.S. Application Data

(63) Continuation of application No. 12/268,004, filed on Nov. 10, 2008, now Pat. No. 8,352,967.

(51) Int. Cl.
| | |
|---|---|
| *G06F 9/46* | (2006.01) |
| *H04L 29/06* | (2006.01) |
| *G06F 9/445* | (2006.01) |
| *G06F 17/30* | (2006.01) |
| *G06F 21/53* | (2013.01) |

(52) U.S. Cl.
CPC ............ *H04L 67/42* (2013.01); *G06F 9/44526* (2013.01); *G06F 17/30861* (2013.01); *G06F 21/53* (2013.01)

(58) Field of Classification Search
CPC .......... G06F 9/44526; G06F 17/30861; G06F 921/53
See application file for complete search history.

(56) References Cited

U.S. PATENT DOCUMENTS

| | | | |
|---|---|---|---|
| 5,764,889 A | 6/1998 | Ault et al. | |
| 5,768,503 A | 6/1998 | Olkin | |
| 5,974,549 A | 10/1999 | Golan | |
| 6,289,382 B1 * | 9/2001 | Bowman-Amuah | 709/226 |
| 6,332,163 B1 * | 12/2001 | Bowman-Amuah | 709/231 |
| 6,339,832 B1 * | 1/2002 | Bowman-Amuah | 714/35 |
| 6,434,628 B1 * | 8/2002 | Bowman-Amuah | 714/48 |
| 6,675,230 B1 | 1/2004 | Lewallen | |
| 6,801,224 B1 | 10/2004 | Lewallen | |
| 7,069,562 B2 | 6/2006 | Kushnirskiy et al. | |
| 7,269,833 B2 | 9/2007 | Kushnirskiy | |
| 7,478,047 B2 * | 1/2009 | Loyall et al. | 704/258 |
| 7,664,948 B2 * | 2/2010 | Moreau | 713/156 |

(Continued)

OTHER PUBLICATIONS

International Search Report directed to related International Application No. PCT/US2009/063607, mailed on Jun. 28, 2010; 2 pages.

(Continued)

*Primary Examiner* — Van Nguyen
(74) *Attorney, Agent, or Firm* — Sterne, Kessler, Goldstein & Fox, P.L.L.C.

(57) ABSTRACT

Some embodiments provide a system that executes plugin for a web browser. During operation, the system obtains the plugin as a native code module and executes the native code module in a secure runtime environment. Next, the system enables communication between the native code module and the web browser by providing an interface bridge between the native code module and the web browser.

27 Claims, 6 Drawing Sheets

(56) References Cited

U.S. PATENT DOCUMENTS

| | | |
|---|---|---|
| 8,352,967 B2 | 1/2013 | Labour et al. |
| 8,458,215 B2 * | 6/2013 | Dettinger et al. ............ 707/781 |
| 2002/0095522 A1 | 7/2002 | Hayko et al. |
| 2003/0005048 A1 | 1/2003 | Risalvato |
| 2003/0079052 A1 | 4/2003 | Kushnirskiy |
| 2003/0126311 A1 | 7/2003 | Kushnirskiy et al. |
| 2005/0246761 A1 | 11/2005 | Ross et al. |
| 2006/0230011 A1 | 10/2006 | Tuttle et al. |
| 2008/0244265 A1 | 10/2008 | Bookman et al. |
| 2009/0282477 A1 | 11/2009 | Chen et al. |
| 2010/0013842 A1 | 1/2010 | Green et al. |
| 2010/0017461 A1 | 1/2010 | Kokkevis et al. |
| 2010/0118038 A1 | 5/2010 | Labour et al. |
| 2010/0118039 A1 | 5/2010 | Labour |

OTHER PUBLICATIONS

Written Opinion directed to related International Application No. PCT/US2009/063607, mailed on Jun. 28, 2010; 4 pages.

* cited by examiner

SAFE BROWSER PLUGINS USING NATIVE CODE MODULES

BACKGROUND

1. Field

The present embodiments relate to techniques for executing plugins for web browsers. More specifically, the present embodiments relate to a method and system for safely executing plugins for web browsers using native code modules.

2. Related Art

Browser plugins are often used to extend the functionality of web browsers. For example, a browser plugin may allow web applications executing within a web browser to open documents, such as Portable Document Format (PDF) files, and/or play media, such as video or audio files. To provide added functionality to web applications, the browser plugin is typically installed as a native code library. In addition, the browser plugin is executed by the web browser when features provided by the browser plugin are requested by the web applications.

However, browser plugins may pose a security risk to the computer systems on which the browser plugins are installed. In particular, browser plugins may have the same access privileges as the host processes (e.g., web browsers) executing the browser plugins. As a result, a malicious browser plugin may make system calls that crash the computer system on which the malicious browser plugin is installed and can possibly obtain sensitive information (e.g., email addresses, passwords, etc.) from the computer system. Along the same lines, browser plugins may contain bugs and/or security vulnerabilities that may be exploited by other applications.

Hence, what is needed is a mechanism for executing browser plugins without the security vulnerabilities described above.

SUMMARY

The described embodiments provide a system that executes a plugin for a web browser. During operation, the system obtains the plugin as a native code module and executes the native code module in a secure runtime environment. Next, the system enables communication between the native code module and the web browser by providing a first plugin interface bridge between the native code module and the web browser.

In some embodiments, the system also enables communication between the native code module and an incompatible web browser by providing a second plugin interface bridge between the first plugin interface bridge and the incompatible web browser.

In some embodiments, the web browser and the incompatible web browser are associated with at least one of a Netscape Plugin Application Programming Interface (NPAPI) plugin architecture and an ActiveX plugin architecture.

In some embodiments, the system also validates the native code module prior to executing the native code module in the secure runtime environment.

In some embodiments, the system executes the native code module in a secure runtime environment that isolates the native code module from sensitive data and resources on the computing system.

In some embodiments, the system also enables communication between the native code module and other plugins for the web browser using a shared memory interface between the native code module and the other plugins.

In some embodiments, the first plugin interface bridge is implemented using a remote procedure call (RPC) mechanism.

In some embodiments, the first plugin interface bridge is implemented using a socket.

In some embodiments, the first plugin interface bridge is implemented using a shared memory.

In some embodiments, providing the first plugin interface bridge between the native code module and the web browser involves using an inter-module communication (IMC) runtime.

In some embodiments, communication between the native code module and the web browser over the IMC runtime is implemented using a proxy and a stub.

In some embodiments, the proxy and the stub are used to reach objects associated with the native code module or the web browser.

DETAILED DESCRIPTION

Figure 1A:
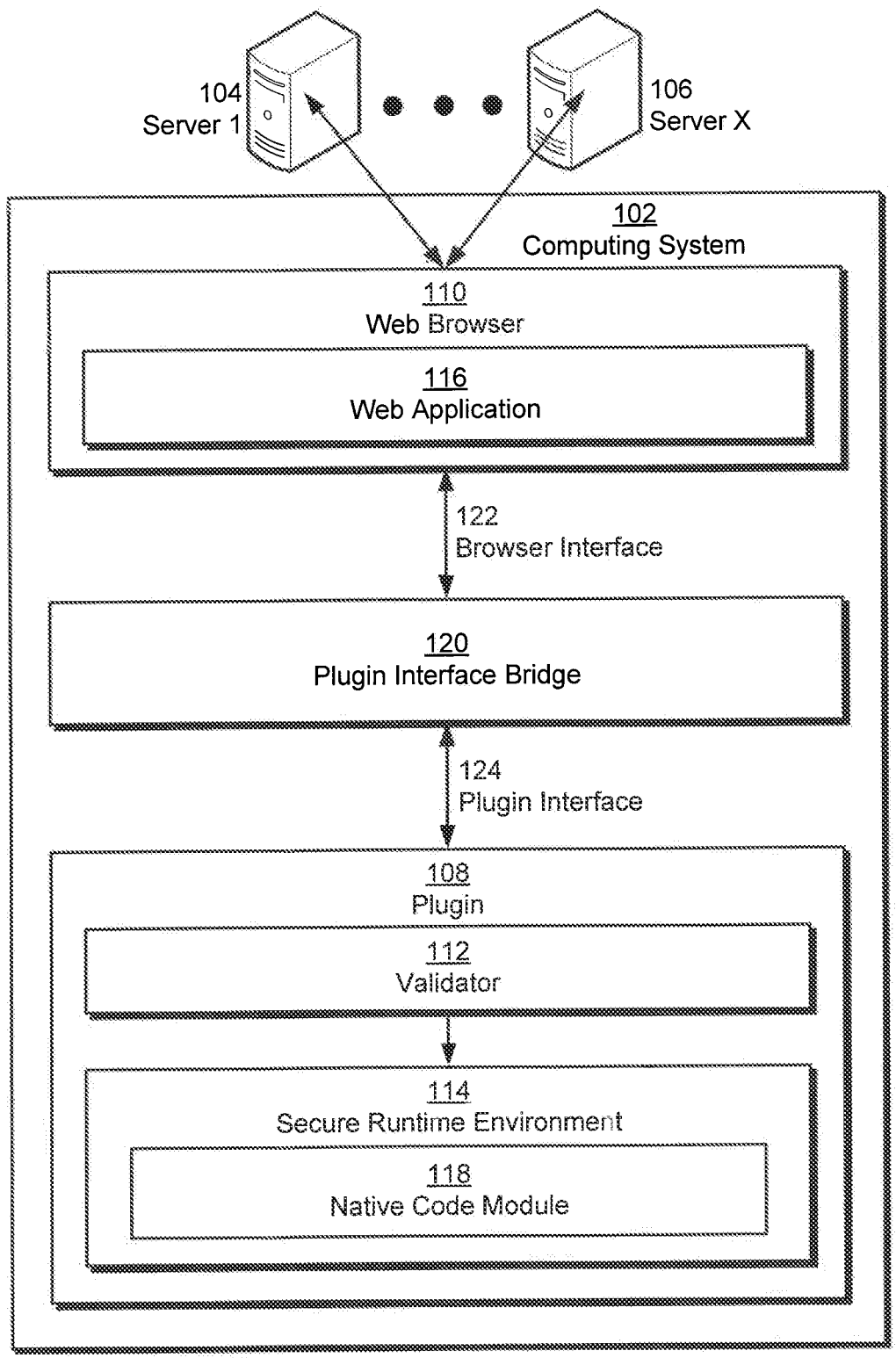
FIG. 1A shows a schematic of an embodiment of a system.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the system is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Embodiments provide a method and system for executing a plugin for a web browser. The plugin may be used by web applications executing within the web browser to extend the functionality of the web browser. In addition, the plugin may be executed on a computing system such as a personal computer (PC), a mobile phone, a personal digital assistant (PDA), a graphing calculator, a portable media player, a global positioning system (GPS) receiver, and/or another electronic computing device.

More specifically, embodiments provide a method and system for safely executing the plugin as a native code module. The native code module may contain native code that is executed within a secure runtime environment that isolates the native code module from sensitive data and resources on the computing system. The native code module may additionally be validated prior to execution within the secure runtime environment to ensure that the native code module complies with a set of security constraints. In addition, communication between the native code module and the web browser may be facilitated by a plugin interface bridge between the native code module and the web browser. A second plugin interface bridge between the first plugin interface bridge and an incompatible web browser may further enable communication between the native code module and the incompatible web browser. Finally, a shared memory interface (or, alternatively, an interface which is based on a socket) may allow the native code module to communicate with other plugins for the web browser.

FIG. 1A shows a schematic of an embodiment of a system. This system includes a computing system 102 and a set of servers (e.g., server 1 104, server x 106). Computing system 102 includes a web application 116 running within a web browser 110 and a plugin 108. Each of these components is described in further detail below.

Computing system 102 can be any type of electronic device that provides one or more services or functions to a user. For example, computing system 102 may operate as a mobile phone, personal computer (PC), global positioning system (GPS) receiver, portable media player, personal digital assistant (PDA), and/or graphing calculator. In addition, computing system 102 may include an operating system (not shown) that coordinates the use of hardware and software resources on computing system 102, as well as one or more applications (e.g., web browser 110, web application 116) that perform specialized tasks for the user. For example, computing system 102 may include applications such as an email client, address book, document editor, web browser 110, and/or media player. To perform tasks for the user, applications may obtain the use of hardware resources (e.g., processor, memory, I/O components, wireless transmitter, etc.) on computing system 102 from the operating system, as well as interact with the user through a hardware and/or software framework provided by the operating system, as described below.

In one or more embodiments, computing system 102 includes functionality to obtain and/or execute applications using a network connection. In particular, computing system 102 may obtain web application 116 from one or more servers (e.g., server 1 104, server x 106) using a network connection with the server(s) and load web application 116 in web browser 110. For example, web application 116 may be downloaded from an application server over the Internet by web browser 110.

Once loaded, web application 116 may provide features and user interactivity comparable to that of native applications on computing system 102. For example, web application 116 may function as an email client, document editor, media player, computer-aided design (CAD) system, and/or computer game. Web application 116 may also include dynamic user interface elements such as menus, buttons, windows, sub-windows, icons, animations, and/or other graphical objects that emulate analogous user interface elements in native applications. In other words, web application 116 may correspond to a rich Internet application (RIA).

Those skilled in the art will appreciate that the features provided by web application 116 may be limited by the functionality of web browser 110. For example, web browser 110 may lack the ability to display documents and/or play media files requested by web application 116. As a result, certain features associated with web application 116 may require the use of plugins for web browser 110 to extend the functionality of web browser 110. For example, web application 116 may use one or more plugins to play audio or video files, display documents, and/or provide other features to the user beyond the capabilities of web browser 110.

Like web application 116, the plugin(s) may be obtained from one or more servers (e.g., server 1 104, server x 106) using a network connection with the server(s). For example, web application 116 may provide a hyperlink to the plugin on the Internet. Web browser 110 may then download the plugin from the Uniform Resource Locator (URL) specified in the hyperlink.

Furthermore, each plugin may correspond to a native code library that is installed locally on computing system 102 and executed by web browser 110. For example, the plugin may correspond to a Netscape Plugin Application Programming Interface (NPAPI) plugin or an ActiveX (ActiveX™ is a registered trademark of Microsoft Corp.) plugin. In other words, plugins for web browser 110 may execute within the same process as web browser 110 and include the same access privileges as web browser 110.

As a result, the local installation and native execution of plugins for web browser 110 may pose a security risk to computing system 102. In particular, the plugins may include bugs and/or security vulnerabilities that may be exploited by other applications on computing system 102. The plugins may also correspond to malicious plugins that are capable of making unrestricted system calls on computing system 102, obtaining sensitive data stored on computing system 102, and/or crashing computing system 102.

To reduce the security risks posed by browser plugins, computing system 102 may obtain and execute each plugin as a native code module 118. As described above, the plugin may be obtained from one or more servers (e.g., server 1 104, server x 106) by web browser 110. Furthermore, the plugin may be obtained as native code module 118 from the server(s), or source code corresponding to the plugin may be obtained from the server(s) by web browser 110 and compiled into native code module 118 by computing system 102.

In one or more embodiments, native code module 118 is executed by a plugin 108 associated with web browser 110. In other words, native code module 118 may provide additional functionality to web browser 110 as a plugin for web browser 110 by executing within plugin 108. Furthermore, the execution of native code module 118 by plugin 108 may allow the additional functionality to be safely used by web application 116, as described below.

In particular, native code module 118 may be validated by a validator 112 provided by plugin 108 prior to execution. Native code module validation is described in a co-pending non-provisional application by inventors J. Bradley Chen, Matthew T. Harren, Matthew Papakipos, David C. Sehr, and Bennet S. Yee, entitled "Method for Validating an Untrusted Native Code Module," having Ser. No. 12/117,634, and filing date 8 May 2008, which is incorporated herein by reference.

Once native code module 118 is validated, native code module 118 may be loaded and executed in a secure runtime environment 114 provided by plugin 108. Native code module execution in a secure runtime environment is described in a co-pending non-provisional application by inventors J. Bradley Chen, Matthew T. Harren, Matthew Papakipos, David C. Sehr, Bennet S. Yee, and Gregory Dardyk, entitled "Method for Safely Executing an Untrusted Native Code Module on a Computing Device," having Ser. No. 12/117,650, and filing date 8 May 2008, which is incorporated herein by reference. Secure runtime environment 114 may also be provided by a web browser extension to web browser 110, and/or secure runtime environment 114 may be built into web browser 110.

Furthermore, because native code module 118 may include binary code that runs directly on hardware, native code module 118 may be platform-independent with respect to the operating system of computing system 102, web browser 110, and/or other software components on computing system 102. As described in the above-referenced applications, plugin 108 and/or native code module 118 may also include mechanisms for executing on a variety of instruction set architectures, including the use of "fat binaries" and binary translators. Consequently, the validation and execution of native code module 118 may enable web application 116 to safely utilize natively executing code in performing tasks for the user.

To enable communication between native code module 118 within secure runtime environment 114 and web browser 110, a plugin interface bridge 120 may be provided between native code module 118 and web browser 110. In particular, plugin interface bridge 120 may implement an inter-process communication (IPC) mechanism (such as a remote procedure call (RPC) mechanism, a socket mechanism and/or a communication mechanism based on a shared memory) between native code module 118 and web browser 110. Furthermore, the IPC mechanism provided by plugin interface bridge 120 may allow native code module 118 to operate as a plugin for web browser 110 (e.g., an NPAPI or ActiveX plugin) without changes to the plugin architecture used by web browser 110.

More specifically, plugin interface bridge 120 may provide a browser interface 122 to web browser 110 and/or web application 116 that corresponds to a list of function calls supported by the plugin architecture of web browser 110. For example, browser interface 122 may allow web application 116 and/or web browser 110 to call NPAPI plugin methods such as NPP_New( ), NPP_Destroy( ), NPP_GetValue( ), and/or NPP_GetScriptableInstance( ). Along the same lines, plugin interface bridge 120 may implement a plugin interface 124 that includes function calls from native code module 118 to web browser 110. For example, plugin interface 124 may allow native code module 118 to call NPAPI browser methods such as NPN_GetValue( ) and/or NPN_Status( ). In other words, plugin interface bridge 120 may allow communication between native code module 118 and web browser 110 to proceed using interfaces supported by the plugin architecture of web browser 110 despite the execution of native code module 118 within secure runtime environment 114.

In one or more embodiments, plugin interface bridge 120 includes an inter-module communication (IMC) runtime between web browser 110 and native code module 118. The IMC runtime may further facilitate communication between proxies and stubs in plugin interface bridge 120 that allow objects exposed by web browser 110 and/or native code module 118 to be reached by other components in the plugin architecture. IMC runtimes are described in further detail in the above-referenced applications. Communication between proxies and stubs using IMC runtimes is described in further detail below with respect to FIGS. 2A-2B.

Figure 1B:
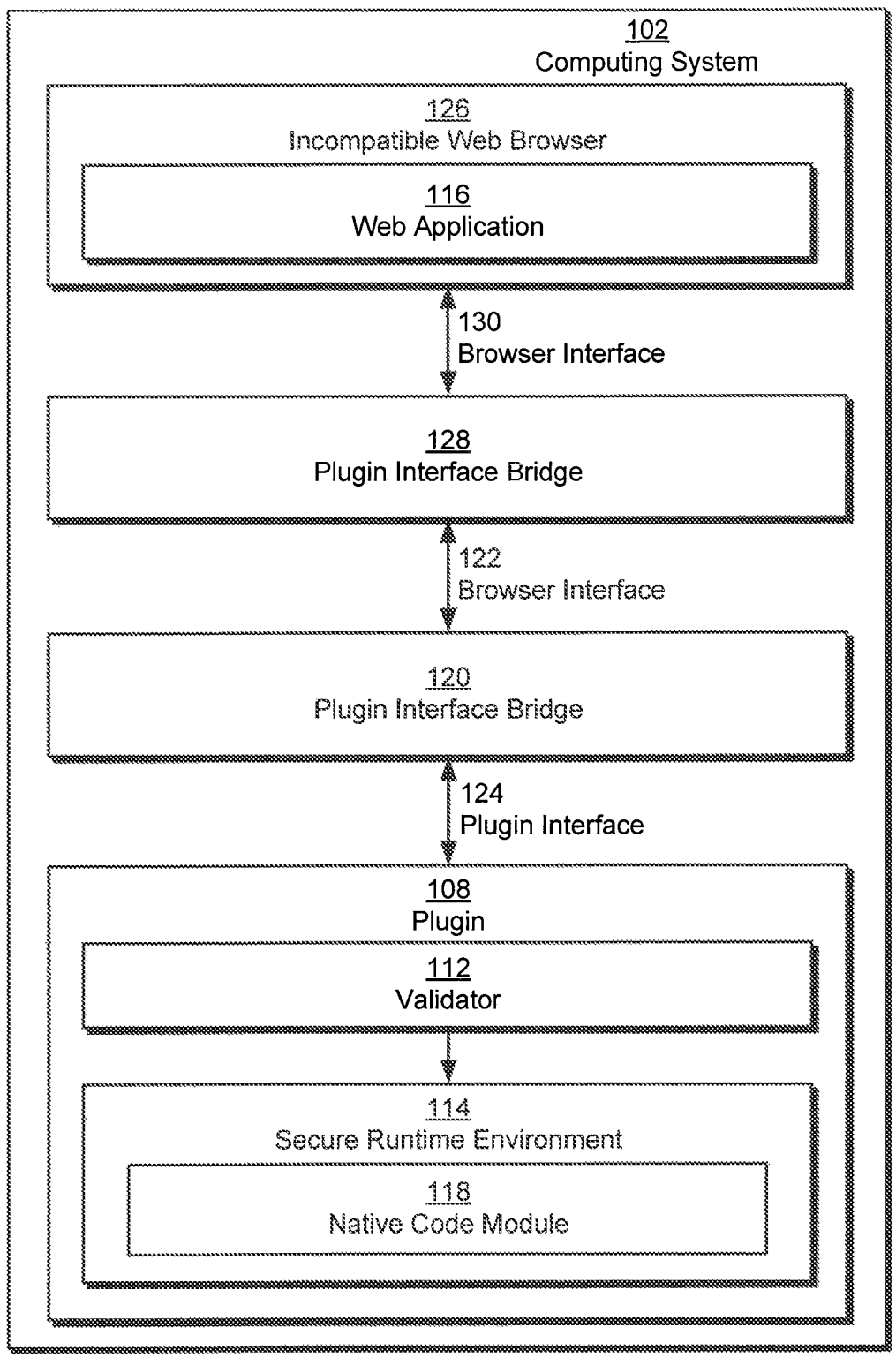
FIG. 1B shows a schematic of an embodiment of a system.

FIG. 1B shows a schematic of an embodiment of a system. More specifically, FIG. 1B shows a system for executing a plugin as native code module 118 for an incompatible web browser 126 on computing system 102. Incompatible web browser 126 may correspond to a web browser that utilizes a different plugin architecture from the plugin architecture of the plugin compiled into native code module 118. For example, incompatible web browser 126 may support the ActiveX plugin architecture while native code module 118 corresponds to an NPAPI plugin, and vice versa.

To enable communication between native code module 118 and incompatible web browser 126, a second plugin interface bridge 128 between plugin interface bridge 120 and incompatible web browser 126 may be used. Plugin interface bridge 128 may allow function calls between native code module 118 and incompatible web browser 126 to be translated into analogous function calls in the plugin architecture of the other component. For example, plugin interface bridge 128 may allow an NPObject interface in NPAPI to be translated into an IDispatch interface in ActiveX and vice versa.

Moreover, plugin interface bridge 128 may provide a browser interface 130 to incompatible web browser 126 that allows incompatible web browser 126 to make function calls in the plugin architecture used by incompatible web browser 126 (e.g., ActiveX). Plugin interface bridge 128 may then translate the function calls to analogous function calls in the plugin architecture of native code module 118 (e.g., NPAPI) and send the analogous function calls to plugin interface bridge 120 using browser interface 122. Plugin interface bridge 120 may then transmit the analogous function calls to native code module 118 using an IMC runtime that implements an IPC mechanism such as RPC and/or sockets.

Figure 1C:
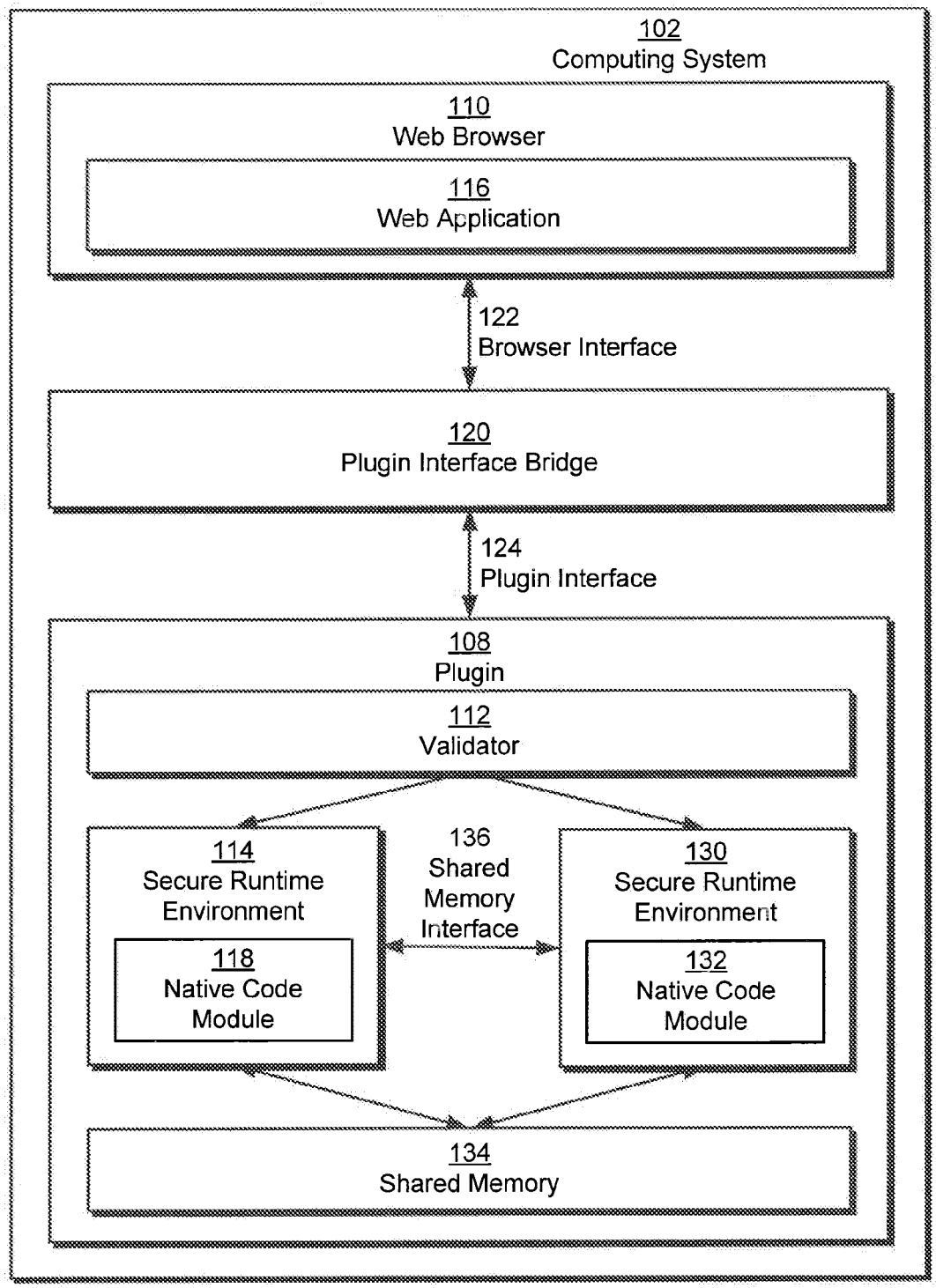
FIG. 1C shows a schematic of an embodiment of a system.

FIG. 1C shows a schematic of an embodiment of a system. In particular, FIG. 1C shows a system for executing multiple plugins for web browser 110 as native code modules. As shown in FIG. 1C, native code module 118 is executed in secure runtime environment 114, while another native code module 132 is executed in a second secure runtime environment 130 as a second plugin for web browser 110. In one or more embodiments, additional functionality to web browser 110 may be provided by interaction between native code module 118 and native code module 132.

For example, native code module 118 and native code module 132 may correspond to modules that respectively calculate physics and graphics for a computer game. The output of the physics-processing module may be passed to the graphics-processing module to animate characters in the computer game.

However, the respective execution of native code module 118 and native code module 132 in secure runtime environment 114 and secure runtime environment 130 may prevent the native code modules from communicating directly with one another. Instead, the native code modules may use plugin interface bridge 120 and/or a shared memory interface 136 to share file descriptors and/or data with both web browser 110 and one another. (Alternatively, a socket-based interface may be used instead of a shared memory-based interface.)

In particular, file descriptors may be shared between native code module 118, native code module 132, and/or web browser 110 through plugin interface bridge 120. For example, web browser 110 may download a file using a network connection with one or more servers and save the file locally on computing system 102. Web browser 110 may then open the file and send a file descriptor for the file to native code module 118 and/or native code module 132 through the IPC mechanism provided by plugin interface bridge 120. Native code module 118 and/or native code module 132 may then use the file descriptor to read directly from the file.

In addition, a shared memory interface 136 may be provided between native code module 118 and native code module 132 to facilitate data transfer between native code module 118 and native code module 132. As with plugin interface bridge 120, shared memory interface 136 may be implemented using an IPC mechanism. Furthermore, shared memory interface 136 may allow native code module 118 and native code module 132 to share data using a segment of shared memory 134.

To set up a segment of shared memory 134, native code module 118 or native code module 132 may create the segment and pass a handle for the segment through plugin interface bridge 120 and/or shared memory interface 136 to the other native code module. For example, native code module 118 may transmit the handle for shared memory 134 to native code module 132 through a socket provided by plugin interface bridge 120. Moreover, the segment of shared memory 134 may be implemented as an IMC buffer that is accessed through shared memory interface 136 by native code module 118 and native code module 132 through an IMC runtime.

As a result, native code module 118 and native code module 132 may transmit data to one another by writing the data to shared memory 134 and reading the data from shared memory 134 using shared memory interface 136. For example, native code module 118 and native code module 132 may animate characters in a computer game by using shared memory interface 136 and shared memory 134 to transmit data such as vertex buffers, index buffers, and/or texture buffers between one another.

Figure 2A:
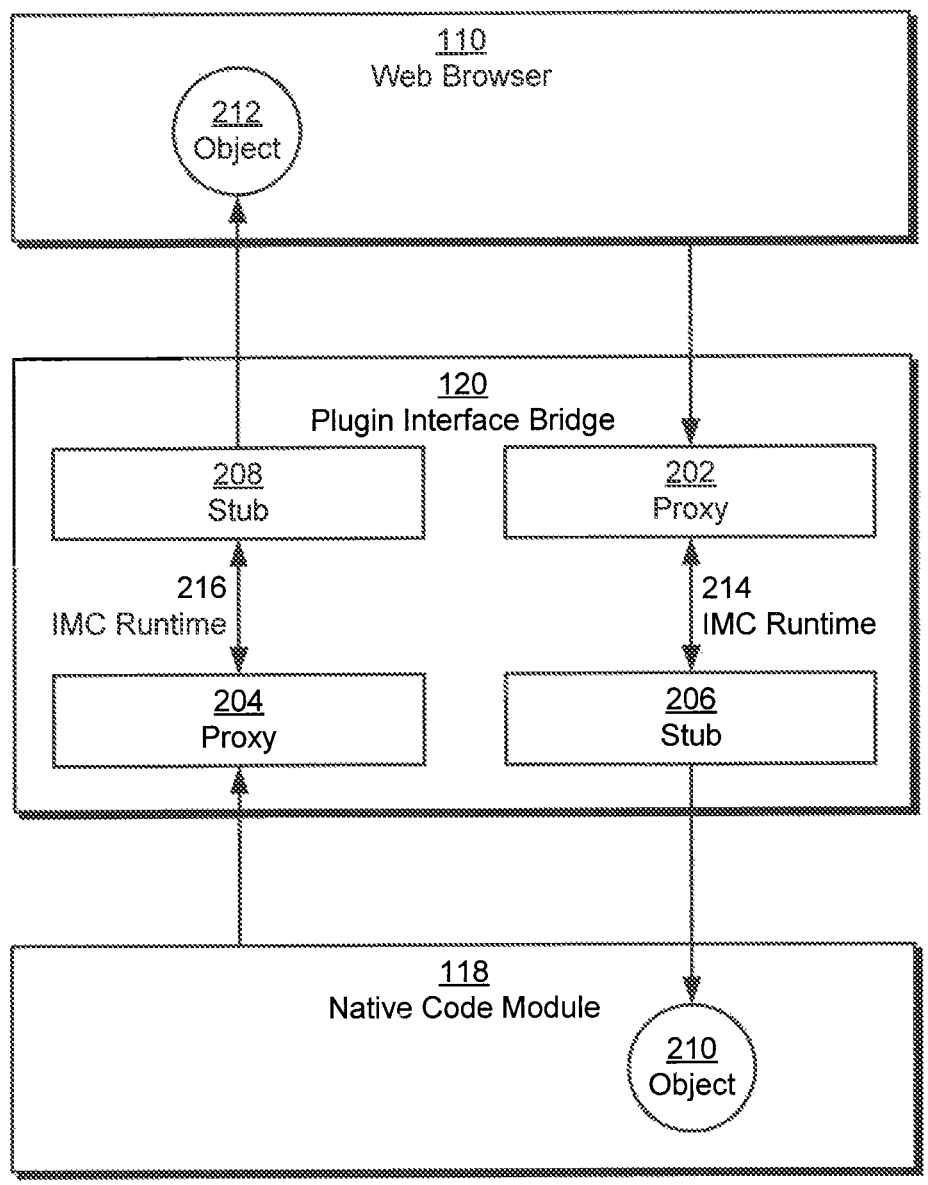
FIG. 2A shows a plugin interface bridge in accordance with an embodiment of the system.

FIG. 2A shows plugin interface bridge 120 in accordance with an embodiment of the system. In particular, FIG. 2A shows the use of plugin interface bridge 120 to enable access to objects associated with web browser 110 and native code module 118. As shown in FIG. 2A, web browser 110 includes an object 212 and native code module 118 includes an object 210. Objects 210-212 may correspond to objects exposed by native code module 118 and web browser 110 through the plugin architecture associated with native code module 118 and web browser 110. For example, objects 210-212 may correspond to NPObjects in NPAPI, Component Object Model (COM) objects in ActiveX, and/or other analogous objects in other plugin architectures.

Native code module 118 and web browser 110 may provide additional functionality to web applications (e.g., web application 116 of FIGS. 1A-1C) executing on web browser 110 by making function calls to the objects exposed by the other component. For example, native code module 118 may request that web browser 110 retrieve data from a URL by making a function call to object 212. Similarly, a web application executing on web browser 110 may utilize the added functionality provided by native code module 118 by making function calls to object 210.

To reach objects through plugin interface bridge 120, web browser 110 and native code module 118 may utilize a set of proxies 202-204, a set of stubs 206-208, and/or a set of IMC runtimes 214-216 provided by plugin interface bridge 120. More specifically, web browser 110 may reach object 210 by calling a proxy 202 provided by plugin interface bridge 120 that represents object 210. Similarly, native code module 118 may reach object 212 by calling a proxy 204 provided by plugin interface bridge 120 that represents object 212. Proxies 202-204 may thus represent remote objects (e.g., objects 210-212) that may be accessed by web browser 110 and native code module 118 through plugin interface bridge 120.

Function calls to proxies 202-204 may then be forwarded over IMC runtimes 214-216 to corresponding stubs 206-208, which translate messages received over IMC runtimes 214-216 into function calls to objects 210-212. In one or more embodiments, the function calls correspond to NPAPI calls to NPObjects, such as NPN_Invoke( ), NPN_GetProperty( ), and/or NPN_SetProperty( ). Analogous function calls to COM objects in ActiveX may also be enabled by plugin interface bridge 120, or by a separate plugin interface bridge (e.g., plugin interface bridge 128 of FIG. 1B). The execution results of the function calls may be sent from stubs 206-208 to proxies 202-204 and relayed to web browser 110 and native code module 118 by proxies 202-204 for use by web browser 110 and native code module 118.

For example, web browser 110 may make a GetProperty( ) function call to proxy 202. Proxy 202 may then send a message corresponding to the GetProperty( ) to stub 206 through IMC runtime 214. Stub 206 may translate the message into an actual GetProperty( ) function call to object 210 and return the execution result (e.g., the property value requested) of the GetProperty( ) function call to web browser 110 through a message to proxy 202 using IMC runtime 214. Similarly, an Invoke( ) function call to object 212 from native code module 118 may be received by proxy 204, which sends a message corresponding to the Invoke( ) function call to stub 208 through IMC runtime 216. Stub 208 may then translate the message into an actual Invoke( ) function call to object 212 and return the execution result of the invoked method to native code module 118 through IMC runtime 216 and proxy 204.

Figure 2B:
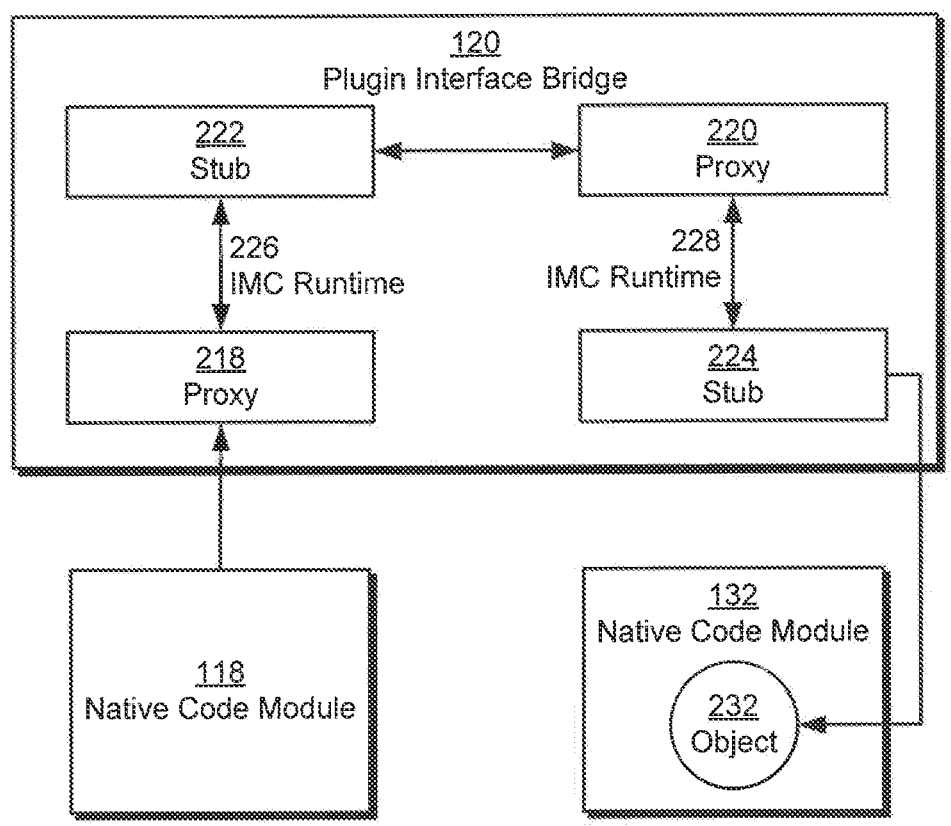
FIG. 2B shows a plugin interface bridge in accordance with an embodiment of the system.

FIG. 2B shows plugin interface bridge 120 in accordance with an embodiment of the system. More specifically, FIG. 2B shows the use of plugin interface bridge 120 to enable access to objects exposed by separate native code modules (e.g., native code module 118 and native code module 132). As with the communication mechanisms illustrated in FIG. 2A, plugin interface bridge 120 may provide a set of proxies 218-220 and a set of stubs 222-224 for reaching an object 232 exposed by one native code module (e.g., native code module 132) from another native code module (e.g., native code module 118).

However, unlike accessing objects between native code modules and web browsers, communications may pass from native code module 118 to object 232 through two proxies 218-220, two stubs 222-224, and two IMC runtimes 226-228. In particular, a function call to object 232 from native code module 118 may be sent to proxy 218, which translates the function call into a message to stub 222 through IMC runtime 226. Instead of calling object 232 directly, stub 222 translates the message back into the function call and calls proxy 220 using the function call. As an interface to remote object 232, proxy 220 may then translate the function call from stub 222 into a message to stub 224 that is sent through IMC runtime 228. Finally, stub 224 may make the function call to object 232 and return the execution result of the function call to native code module 118 through IMC runtime 228, proxy 220, stub 222, IMC runtime 226, and proxy 218.

Those skilled in the art will appreciate that communication between native code modules and web browsers and/or separately executing native code modules may be implemented in a variety of ways. For example, plugin interface bridge 120 may enable communication between various components (e.g., native code modules, web browsers, etc.) of a plugin architecture through a chain of proxies, stubs, and/or IMC runtimes. Alternatively, plugin interface bridge 120 may pass function calls from one component to another using only one proxy and one stub. Additionally, multiple plugin interface bridges may be used to enable communication between native code modules and incompatible web browsers, as discussed above with respect to FIG. 1B. Each plugin interface bridge may provide interaction between stubs and proxies in a different way. As a result, interaction between native code modules and incompatible web browsers may be facilitated using a variety of plugin interface bridges, proxies, stubs, and/or IMC runtimes.

Figure 3:
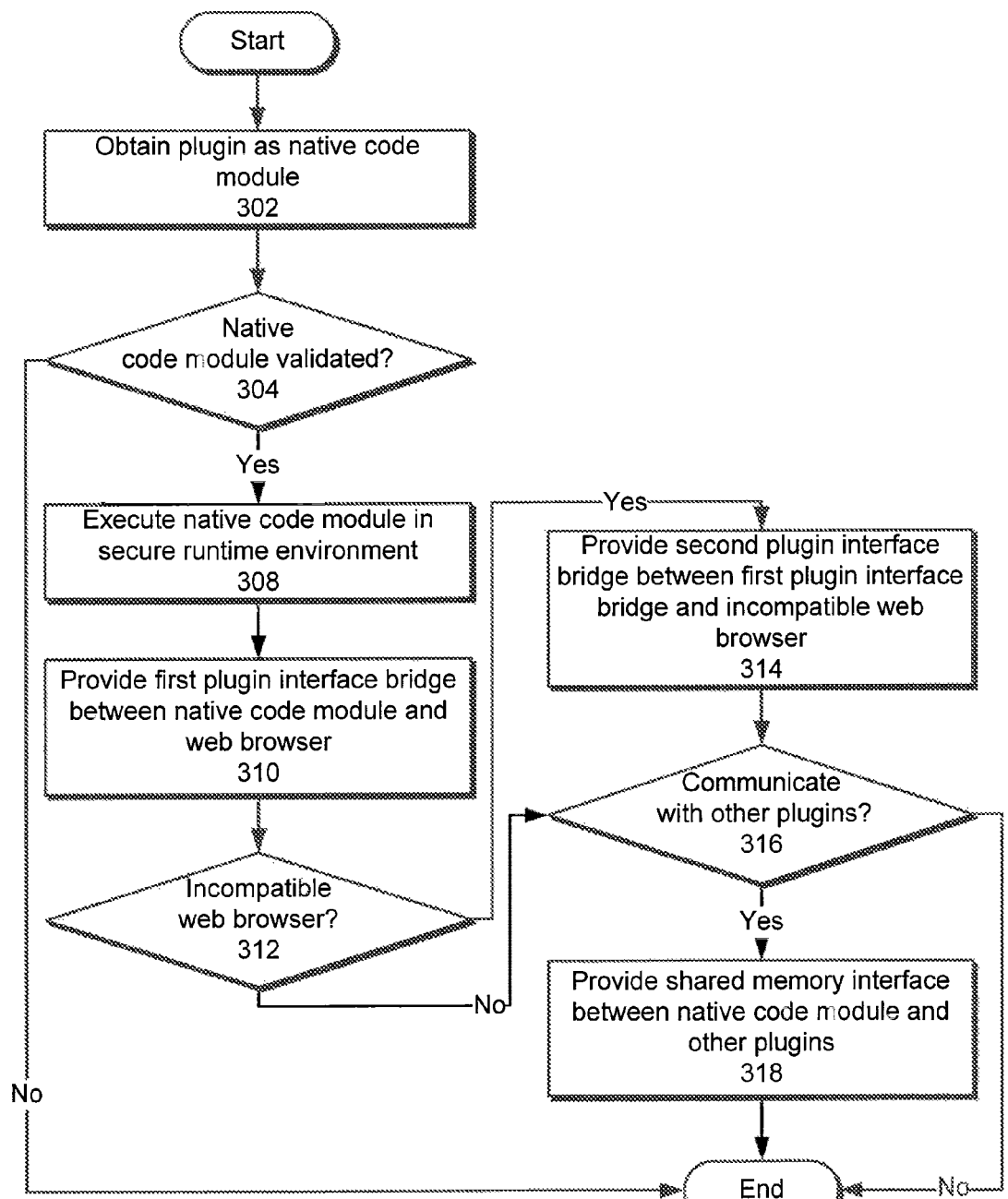
FIG. 3 shows a flowchart illustrating the process of executing a plugin for a web browser.

FIG. 3 shows a flowchart illustrating the process of executing a plugin for a web browser. In one or more embodiments, one or more of the steps may be omitted, repeated, and/or performed in a different order. Accordingly, the specific arrangement of steps shown in FIG. 3 should not be construed as limiting the scope of the technique.

Initially, the plugin is obtained as a native code module (operation 302). For example, the plugin may be downloaded as a native code module from one or more servers, or the plugin may be compiled into a native code module from source code. The system then attempts to validate the native code module (operation 304) prior to executing the native code module. If the native code module fails validation, the native code module is discarded without having been executed. If the native code module is successfully validated, the native code module is executed in a secure runtime environment (operation 308). The secure runtime environment may be provided by a plugin associated with the web browser, a browser extension to the web browser, and/or a component within the web browser.

To enable communication between the native code module and the web browser, a first plugin interface bridge is provided between the native code module and the web browser (operation 310). The first plugin interface bridge may include an IMC runtime that allows the native code module and the web browser to communicate using an IPC mechanism such as RPC or a socket. The first plugin interface bridge may further provide interfaces to the native code module and web browser that allow the native code module and web browser to continue executing using the plugin architecture supported by the native code module and/or web browser. In other words, the first plugin interface bridge may enable a native code module executing within a secure runtime environment to communicate with the web browser using standard function calls supported by the plugin architecture of the web browser. As a result, the native code module and web browser may execute and interact with one another without awareness of the first plugin interface bridge and secure runtime environment.

The native code module may also interact with an incompatible web browser (operation 312). For example, the native code module may correspond to an NPAPI plugin while the web browser may support ActiveX plugins, and vice versa. If the native code module is to communicate with an incompatible web browser, a second plugin interface bridge between the first plugin interface bridge and the incompatible web browser is provided (operation 314). The second plugin interface bridge may allow function calls between the native code module and the incompatible web browser to be translated into analogous function calls in the plugin architecture of the other component. For example, the second plugin interface bridge may translate function calls in ActiveX to function calls in NPAPI, and vice versa. If the native code module is not used by an incompatible web browser, the second plugin interface bridge is not used.

The native code module may also communicate with other plugins (operation 316) for the web browser. For example, the native code module may correspond to a physics-processing module that communicates with a graphics-processing native code module to render and animate 3D graphics for a web application executing within the web browser. If communication with other plugins is required, a shared memory interface between the native code module and other plugins is provided (operation 318). As with the plugin interface bridges, the shared memory interface may be implemented using an IPC mechanism. In addition, the shared memory interface (or, alternatively, a socket-based interface) may allow the native code module and other plugins to share data by reading from and writing to a shared memory segment that may be accessed through the shared memory interface. If data sharing with other plugins is not required, the shared memory interface is not used.

The native code module may thus provide added functionality to a compatible or incompatible web browser and/or communicate with other browser plugins using the first plugin interface bridge, the second plugin interface bridge, and/or the shared memory interface. Furthermore, the execution of the native code module within the secure runtime environment may facilitate the safe and platform-independent implementation of a browser plugin for a web browser.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the present embodiments. The scope of the embodiments is defined by the appended claims.

What is claimed is:

1. A method for facilitating execution of a plugin for a web browser, comprising:
   providing a first plugin interface bridge between a first native code module which implements a first plugin and the web browser to enable communication between the first native code module and the web browser, wherein the first plugin is installed on a computer system;
   executing the first native code module in a first secure runtime environment such that the first secure runtime environment isolates the first native code module from data and resources on the computer system;
   executing a second native code module which implements a second plugin in a second secure runtime environment; and
   using the first plugin interface bridge to enable communication between the first native code module and the second native code module.

2. The method of claim 1, further comprising:
   enabling communication between the first native code module and an incompatible web browser with an incompatible plugin architecture by providing a second plugin interface bridge between the first plugin interface bridge and the incompatible web browser.

3. The method of claim 2, wherein the incompatible web browser is associated with one of a Netscape Plugin Application Programming Interface (NPAPI) plugin architecture and an ActiveX plugin architecture, and the first plugin is associated with the other of the NPAPI plugin architecture and the ActiveX plugin architecture.

4. The method of claim 1, further comprising:
   validating the first native code module prior to executing the first native code module in the first secure runtime environment.

5. The method of claim 1, further comprising:
enabling communication between the first and second native code modules using a shared memory interface between the first and second native code modules.

6. The method of claim 1, wherein the first plugin interface bridge is implemented using at least one of, a remote procedure call (RPC) mechanism, a socket and a shared memory.

7. The method of claim 1, wherein providing the first plugin interface bridge between the first native code module and the web browser involves using an inter-module communication (IMC) runtime.

8. The method of claim 7, wherein communication between the first native code module and the web browser over the IMC runtime is implemented using a proxy and a stub.

9. The method of claim 8, wherein the proxy and the stub are used to reach objects associated with the first native code module or the web browser.

10. A system for executing a plugin for a web browser, comprising:
a processor;
a memory coupled to the processor;
a first secure runtime environment, implemented on the processor, that executes a first native code module which implements a first plugin such that the first secure runtime environment isolates the first native code module from data and resources on a computer system, wherein the first plugin is installed on the computer system;
a first plugin interface bridge between the first native code module and the web browser, wherein the first plugin interface bridge enables communication between the first native code module and the web browser; and
a second secure runtime environment that executes a second native code module which implements a second plugin in the second secure runtime environment, wherein the first plugin interface bridge enables communication between the first native code module and the second native code module.

11. The system of claim 10, further comprising:
a second plugin interface bridge between the first plugin interface bridge and an incompatible web browser with an incompatible plugin architecture, wherein the second plugin interface bridge enables communication between the first native code module and the incompatible web browser.

12. The system of claim 11, wherein the incompatible web browser is associated with one of a Netscape Plugin Application Programming Interface (NPAPI) plugin architecture and an ActiveX plugin architecture, and the first plugin is associated with the other of the NPAPI plugin architecture and the ActiveX plugin architecture.

13. The system of claim 10, further comprising:
a validator that validates the first native code module prior to executing the first native code module.

14. The system of claim 10, further comprising:
a shared memory interface that enables communication between the first and second native code modules.

15. The system of claim 10, wherein the first plugin interface bridge is implemented using at least one of, a remote procedure call (RPC) mechanism, a socket and a shared memory.

16. The system of claim 10, wherein providing the first plugin interface bridge between the first native code module and the web browser involves using an inter-module communication (IMC) runtime.

17. The system of claim 16, wherein communication between the first native code module and the web browser over the IMC runtime is implemented using a proxy and a stub.

18. The system of claim 17, wherein the proxy and the stub are used to reach objects associated with the first native code module or the web browser.

19. A non-transitory computer-readable storage medium storing instructions that when executed by a computer cause the computer to perform a method for facilitating execution of a plugin for a web browser, the method comprising:
providing a first plugin interface bridge between a first native code module which implements a first plugin and the web browser to enable communication between the first native code module and the web browser, wherein the first plugin is installed on a computer system;
executing the first native code module in a first secure runtime environment such that the first secure runtime environment isolates the first native code module from data and resources on the computer system;
executing a second native code module which implements a second plugin in a second secure runtime environment; and
using the first plugin interface bridge to enable communication between the first native code module and the second native code module.

20. The computer-readable storage medium of claim 19, wherein the method further comprises:
enabling communication between the first native code module and an incompatible web browser with an incompatible plugin architecture by providing a second plugin interface bridge between the first plugin interface bridge and the incompatible web browser.

21. The computer-readable storage medium of claim 20, wherein the incompatible web browser is associated with one of a Netscape Plugin Application Programming Interface (NPAPI) plugin architecture and an ActiveX plugin architecture, and the first plugin is associated with the other of the NPAPI plugin architecture and the ActiveX plugin architecture.

22. The computer-readable storage medium of claim 19, wherein the method further comprises:
validating the first native code module prior to executing the first native code module in the first secure runtime environment.

23. The computer-readable storage medium of claim 19, wherein the method further comprises:
enabling communication between the first and second native code modules using a shared memory interface between the first and second native code modules.

24. The computer-readable storage medium of claim 19, wherein the first plugin interface bridge is implemented using at least one of, a remote procedure call (RPC) mechanism, a socket and a shared memory.

25. The computer-readable storage medium of claim 19, wherein providing the first plugin interface bridge between the first native code module and the web browser involves using an inter-module communication (IMC) runtime.

26. The computer-readable storage medium of claim 25, wherein communication between the native code module and the web browser over the IMC runtime is implemented using a proxy and a stub.

27. The computer-readable storage medium of claim 26, wherein the proxy and the stub are used to reach objects associated with the first native code module or the web browser.

* * * * *